US010984791B2

(12) United States Patent
Arora et al.

(10) Patent No.: US 10,984,791 B2
(45) Date of Patent: Apr. 20, 2021

(54) SPOKEN LANGUAGE INTERFACE FOR NETWORK MANAGEMENT

(71) Applicant: Hughes Network Systems, LLC, Germantown, MD (US)

(72) Inventors: Amit Arora, Germantown, MD (US); Archana Gharpuray, Germantown, MD (US); John Kenyon, Germantown, MD (US)

(73) Assignee: Hughes Network Systems, LLC, Germantown, MD (US)

( * ) Notice: Subject to any disclaimer, the term of this patent is extended or adjusted under 35 U.S.C. 154(b) by 135 days.

(21) Appl. No.: 16/204,287

(22) Filed: Nov. 29, 2018

(65) Prior Publication Data

US 2020/0175971 A1 Jun. 4, 2020

(51) Int. Cl.
 *G10L 15/22* (2006.01)
 *G10L 15/30* (2013.01)
 *H04B 7/185* (2006.01)
 *G10L 13/00* (2006.01)
 *G10L 15/26* (2006.01)

(52) U.S. Cl.
 CPC .............. *G10L 15/22* (2013.01); *G10L 13/00* (2013.01); *G10L 15/26* (2013.01); *G10L 15/30* (2013.01); *H04B 7/18519* (2013.01)

(58) Field of Classification Search
 CPC .................................................... G10L 15/22
 See application file for complete search history.

(56) References Cited

U.S. PATENT DOCUMENTS

| 5,218,537 | A  | 6/1993  | Hemphill |
|-----------|----|---------|----------|
| 7,478,089 | B2 | 1/2009  | Henkin |
| 8,326,833 | B2 | 12/2012 | Muguda |
| 8,626,511 | B2 | 1/2014  | LeBrau et al. |
| 1,024,175 | A1 | 2/2014  | Allen et al. |
| 9,082,402 | B2 | 7/2015  | Yadgar et al. |
| 9,098,467 | B1 | 8/2015  | Blanksteen et al. |
| 9,105,268 | B2 | 8/2015  | Srivastava et al. |
| 9,386,152 | B2 | 7/2016  | Riahi et al. |
| 9,489,171 | B2 | 11/2016 | Klein et al. |
| 9,536,527 | B1 * | 1/2017 | Carlson ................... H04R 1/08 |
| 9,542,099 | B1 | 1/2017  | Linden |

(Continued)

OTHER PUBLICATIONS

'www.blog.evernote.com' [online] "How Evernote's Image Recognition Works, Evernote Tech Blog," Jul. 18, 2013, [retrieved on Jan. 23, 2020] Retrieved from Internet URL<http://blog.evernote.com/tech/2013/07/18/how-evernotes-image-recognition-works/> 4 pages.

(Continued)

*Primary Examiner* — Douglas Godbold
(74) *Attorney, Agent, or Firm* — Fish & Richardson P.C.

(57) ABSTRACT

Methods and systems for spoken language interface for network management are disclosed. In some implementations, data indicating a transcription of a spoken request from a user of a voice-response interface is received. Status information for a communication system is received. The request is interpreted based on the transcription and the status information for the communication system. A response to the request is generated based on the status information for the communication system, and data for a synthesized speech utterance of the response is provided in response to the spoken request.

19 Claims, 4 Drawing Sheets

(56) References Cited

U.S. PATENT DOCUMENTS

| | | | |
|---|---|---|---|
| 9,560,199 | B2 | 1/2017 | Mexhibovsky et al. |
| 9,582,246 | B2 | 2/2017 | Klein et al. |
| 2003/0105637 | A1* | 6/2003 | Rodriguez ............ G10L 19/008 704/270 |
| 2004/0024739 | A1 | 2/2004 | Copperman |
| 2005/0119896 | A1* | 6/2005 | Bennett .................. G10L 15/18 704/270.1 |
| 2006/0123220 | A1 | 6/2006 | Colson |
| 2006/0206220 | A1 | 9/2006 | Amundson |
| 2007/0174043 | A1 | 7/2007 | Makela |
| 2008/0104052 | A1 | 5/2008 | Ryan |
| 2010/0094835 | A1 | 4/2010 | Lu |
| 2010/0217657 | A1 | 8/2010 | Gazdzinski |
| 2011/0047514 | A1 | 2/2011 | Butin et al. |
| 2011/0246880 | A1 | 10/2011 | Horton |
| 2012/0016678 | A1 | 1/2012 | Gruber et al. |
| 2012/0034904 | A1 | 2/2012 | Lebeau et al. |
| 2013/0173604 | A1 | 7/2013 | Li et al. |
| 2013/0185081 | A1 | 7/2013 | Cheyer et al. |
| 2013/0185336 | A1 | 7/2013 | Singh |
| 2013/0275164 | A1 | 10/2013 | Gruber et al. |
| 2013/0275875 | A1 | 10/2013 | Gruber et al. |
| 2013/0297317 | A1 | 11/2013 | Lee |
| 2014/0032529 | A1 | 1/2014 | Chang |
| 2014/0040748 | A1 | 2/2014 | Lemay et al. |
| 2014/0108424 | A1 | 4/2014 | Casella dos Santos |
| 2014/0222436 | A1 | 8/2014 | Binder |
| 2014/0244263 | A1* | 8/2014 | Pontual ............... G06F 3/04842 704/260 |
| 2015/0179186 | A1 | 6/2015 | Swierk et al. |
| 2015/0227522 | A1 | 8/2015 | O'Donnell |
| 2015/0350118 | A1 | 12/2015 | Yang |
| 2016/0078115 | A1 | 3/2016 | Battista |
| 2016/0219048 | A1* | 7/2016 | Porras .................. H04L 41/147 |
| 2016/0358603 | A1 | 12/2016 | Azam et al. |
| 2017/0185375 | A1* | 6/2017 | Martel .................... G10L 15/26 |
| 2017/0325111 | A1* | 11/2017 | Reese .................. H04W 24/08 |
| 2017/0371885 | A1 | 12/2017 | Aggarwal et al. |
| 2018/0364975 | A1* | 12/2018 | Kwong ............. G06F 16/24522 |
| 2019/0035387 | A1 | 1/2019 | Zitouni et al. |
| 2019/0074006 | A1 | 3/2019 | Kumar et al. |

OTHER PUBLICATIONS

'www.boxoft.com' [online] "Boxoft Screen OCR—capture screen and convert screen text into editable electronic text," Jun. 26, 2012 [retrieved on Jan. 23, 2020] Retrieved from Internet: URL<https://web/archive/org/web/20120626172711/http://www.boxoft.com/screen-ocr/> 2 pages.

'www.mydigitallife.onfo' [online] "Copy Screenshot Image as Text with Screen Capture OCR My Digital Life," Nov. 19, 2015, [retrieved on Jan. 23, 2020] Retrieved from Internet: URL<https://web.archive.org/web/20151119131504/http://www.mydigitallife.info/copy-screenshot-image0as0text-with-screen-capture-ocr/> 5 pages.

Goode, "Google Now on Tap might just be the killer feature of Android Marshmallow," Oct. 5, 2015 [retrieved on Jan. 23, 2020]. Retrieved from the Internet: URL<http://www.theverge.com/2015/10/5/9444039/google-now-on-tap-feature-android-m-hands-on-video>, 4 pages.

Okonkwo, "Now on Tap update: Text Select and Image Search," Jun. 1, 2016 [retrieved on Jan. 23, 2020]. Retrieved from the Internet: URL<https://search.googleblog.com/2016/06/now-on-tap-update-text-select-and-image.html>, 9 pages.

Wikipedia.com [online], "Amazon Alexa," Sep. 26, 2016, retrieved on Jan. 23, 2020, retrieved from URL <https://en.wikipedia.org/wiki/Amazon_Alexa,> 25 pages.

Wikipedia.com [online], "Google Assistant," Oct. 21, 2016, retrieved on Jan. 23, 2020, retrieved from URL <https://en.wikipedia.org/wiki/Google_Assistant>, 13 page.

Wikipedia.com [online], "Interactive voice response," May 6, 2004, retrieved on Jan. 23, 2020, retrieved from URL<https://en.wikipedia.org/wiki/Interactive_voice_response>, 10 pages.

PCT International Search Report and Written Opinion in International Appln. No. PCT/US2019/062254, dated Feb. 7, 2020, 13 pages.

\* cited by examiner

SPOKEN LANGUAGE INTERFACE FOR NETWORK MANAGEMENT

BACKGROUND

Satellite communication systems are complex systems. Human operators can interface with satellite communication systems to configure system operations, monitor system performance, and troubleshoot system problems.

SUMMARY

In some implementations, a spoken language interface enhances a human operator's ability to manage a satellite communication system or other network. The spoken language interface can be implemented as a virtual network assistant (VNA), which executes instructions for various tasks as directed by the human operator. For example, the VNA can receive a voice query from the operator and provide a response that reflects the current state of the satellite communication system, and in some instances historical information or information predicted future conditions. In some implementations, the VNA trains and uses machine learning models to interpret user requests and provide responses, which in some cases indicate one or more recommended actions to alter the operation of the satellite communication system. In some implementations, the VNA may be configured to carry out various actions that alter operation of a network, such as re-starting devices, changing configuration settings, or performing other actions as directed by the operator.

The VNA can implement various levels of contextual understanding to enhance its effectiveness. This context can include the current state of the conversational dialog, the current state of the network, and the historical state or patterns of activity for the network. The VNA can be configured to interact in a conversational way, using the input of a user during a session to better interpret and respond to later user requests. For example, if a user asks about a previous network outage, the VNA can respond describing the event. If the operator simply responds "tell me more about the outage," the VNA can provide additional information about the event, recognizing that information is desired about the same event discussed earlier. Similarly, the VNA can have access to real-time data feeds indicating the status of various network components, allowing the VNA to initiate alerts to the operator or respond to operator inquiries with current information. In addition, the VNA can have access to various historical information about the network, allowing it to compare current conditions to prior conditions. This can be helpful as the VNA informs the operator of the severity of a condition compared to prior conditions, or informs the operator of steps previously taken to mitigate a problem similar to one currently experienced by the network.

The VNA can be useful in a number of applications. For example, the VNA can provide operations support, guiding an operator step-by-step through actions needed to carryout a network management procedure. The VNA can also be used to provide training to an operator, and to serve as a front end to a knowledge base. The VNA can also provide high-level summaries of network status and summaries of recent events, which can be tailored for different users according to their preferences or roles in managing the network. These and other capabilities of a VNA are discussed further below.

In some implementations, a method performed by one or more computers includes: receiving, by the one or more computers, data indicating a transcription of a spoken request from a user of a voice-response interface for a satellite communication system, wherein the spoken request is detected by a client device and the transcription is generated by an automated speech recognizer; accessing, by the one or more computers, status information for the satellite communication system, the status information indicating current characteristics of the satellite communication system; interpreting, by the one or more computers, the request based on the transcription and the status information for the satellite communication system; generating a response to the request based on the status information for the satellite communication system; and causing, by the one or more computers, a synthesized speech utterance of the response to be output by the client device in response to the spoken request.

In some implementations, interpreting the request includes determining that the transcription of the request includes a predetermined keyword corresponding to a particular type of request.

In some implementations, interpreting the request includes receiving, from a server system that provides the automated speech recognizer, data indicating a request type that the server system determined based on the request.

In some implementations, the method includes: accessing data indicating a predetermined threshold for initiating a message over the voice-response interface, the predetermined threshold corresponding to a condition of the satellite communication system; determining, based on evaluation of one or more attributes of the status information with the predetermined threshold, that the predetermined threshold is satisfied; and in response to determining that the predetermined threshold is satisfied, initiating transmission of a message indicating the presence of the condition of the satellite communication system.

In some implementations, the method includes: determining that a condition of the satellite communication system is present; identifying a previous instance of the condition of the satellite communication system and one or more previous network management actions that removed the previous instance of the condition; and providing a message indicating the previous network management actions that removed the previous instance of the condition.

In some implementations, the method includes repeating the network management actions that removed the previous instance of the condition.

In some implementations, the method includes providing, by the one or more computers and to the client device over a network, instructions causing display of a user interface indicating current or historical attributes of the satellite communication system. Generating the response includes generating a response that refers to the current or historical attributes of the satellite communication system that the instructions caused to be displayed on the user interface.

In some implementations, the method includes accessing user interface data indicating content of the user interface displayed on the client device; interpreting the request includes identifying, based on the user interface data, one or more elements of the user interface displayed on the client device that are related to the request; and generating the response to the request includes generating a response that refers to one or more elements of the user interface.

In some implementations, interpreting the request includes determining that the request calls for a summary of events that have occurred in the network. Generating the response includes: identifying a time period; accessing log data indicating events for the network over the time period; selecting a subset of the events in the network based on one or more criteria; and generating the response to indicate the selected subset of events.

In some implementations, selecting a subset of the events includes (i) filtering the events indicated by the log data based on an intensity, duration, or number of the events, or (ii) ranking the events and selecting the subset of the events based on the ranking.

In some implementations, the request references a network management action; and generating the response includes generating the response to include a series of instructions for carrying out a procedure for performing the network management action.

In some implementations, the method includes obtaining, during a conversational dialogue between the user and the voice interface that includes multiple rounds of interaction that each include (i) spoken user input and (ii) a response through the voice interface, content of different user interfaces successively displayed during the conversational dialog; and generating and providing, for one or more of the responses through the voice interface, a particular response, based on the content of the successive user interface views, that refers to one or more user-selectable controls from among the set of user-selectable controls available to the user in the user interface view shown to the user when the particular response is output to the user.

In some implementations, the method includes determining, based on the data indicating the transcription of the spoken request and the status information for the satellite communication system, a dialogue state from among multiple dialogue states that represent different steps for performing a management task related to the satellite communication system. Generating the response is performed based on the determined dialogue state, wherein each of the dialogue states have different sets of associated content, and the response is generated using the content associated with the determined dialogue state.

In some implementations, the method includes selecting a task or workflow, from among multiple predetermined tasks or workflows, based on the data indicating the transcription of the spoken request and the status information for the satellite communication system. Generating the response includes including, in the response, a request to the user that guides the dialogue to the selected task or workflow.

In some implementations, each of predetermined tasks or workflows includes a series of dialogue states, and wherein generating the response includes generating the response using content associated with one or more dialogue states of the selected task or workflow.

Other embodiments of these aspects include corresponding systems, apparatus, and computer programs, configured to perform the actions of the methods, encoded on computer storage devices. A system of one or more computers can be so configured by virtue of software, firmware, hardware, or a combination of them installed on the system that in operation cause the system to perform the actions. One or more computer programs can be so configured by virtue having instructions that, when executed by data processing apparatus, cause the apparatus to perform the actions.

Various implementations may provide one or more of the following advantages. As satellite communication systems are complex and integrate many subsystems and components, configuring and troubleshooting a system can be difficult and time consuming for operators, even for those operators with extensive training and experience. Accessing particular network data or determining a condition of the system, a subsystem, or a component can require the operator to know a specialized vocabulary (e.g., search terms, key words), to be familiar with a specialized computer language (e.g., function calls, syntax), or to use dedicated software. Using the machine learning techniques described herein, a computer system implementing a VNA can interpret and respond to voice queries presented in the native, colloquial language of the operator, enabling operators to determine system and subsystem information without expert knowledge of search terms, keywords, system-specific function calls, or specialized syntax.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

In general, a virtual network assistant (VNA) can assist an operator to manage a network such as a satellite communication system. A voice query spoken by an operator of the network can detected by a client device (e.g., a phone, laptop computer, desktop computer, etc.) and be sent to a voice processing server, which generates a transcript of the query and determines a general intent of the query (e.g., requesting network status information, requesting a summary of recent events, etc.). The VNA can then receive a transcript of the query and the general intent from the voice server, then interpret the query and generate a response that will be audible played by the client device to the operator.

Figure 1:
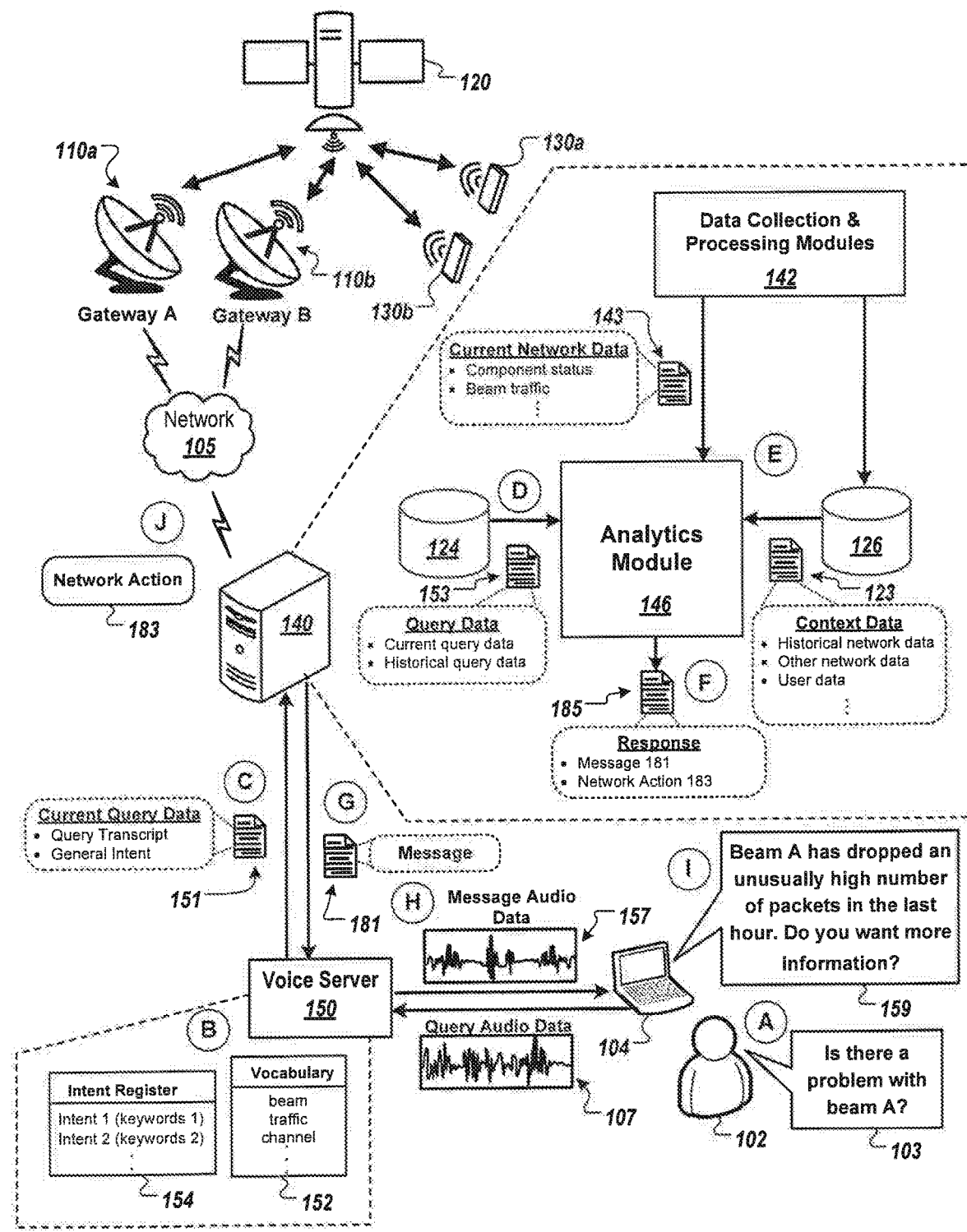
FIG. 1 is a diagram that illustrates an example of a system for a spoken language interface to a satellite communication system.

FIG. 1 is a diagram that illustrates an example of a system 100 for a spoken language interface to a satellite communication system. Three main elements of the system 100 cooperate to provide the voice interface: a client device 104, a voice server 150, and a computer system 140. The client device 104 records spoken requests of a network operator 102 and sends them for processing by a server. The voice server 150 processes performs automated speech recognition on the audio data for a request to determine a transcript of the operator request. The computer system 140 then receives and uses the transcript of the voice request to interpret the operator's request generate a response. This process is illustrated in FIG. 1 in further detail through stages (A) through (J), which illustrate a flow of data as an operator 102 uses the VNA to manage the satellite communication network.

In the example of FIG. 1, the satellite communication system includes satellite gateways 110a and 110b that communicate with a satellite 120, which in turn communicates with satellite terminals 130a and 130b. The computer system 140 obtains information about the satellite communication system, for example, by communicating with the satellite gateways 110a and 110b over a communication network 105. The elements shown can be part of a larger satellite communication network that includes several satellites, several satellite gateways, satellite terminals, and other elements not illustrated.

The computer system 140 provides the virtual network assistant (VNA) that provides a spoken language interface to the satellite communication system. The VNA receives from a voice server 150 a transcript and a general intent of a voice query 103 that is spoken by an operator 102. The VNA may include one or more trained machine learning models that (i) interpret the voice query 103, (ii) analyze the query results, and (iii) generate one or more responses 185 to the query 103.

The satellite gateways 110a and 110b can be ground stations that manage data transmission to and from one or more satellites 120 of the communication system. The gateways 110a and 110b may be geographically dispersed (i.e., situated in different geographic locations) and can include multiple subsystems and components that support gateway operation. For example, the gateways 110a and 110b can each include one or more antenna systems, transmitter systems, receiver systems, routers, networking systems, or other systems that support network communications within the satellite communication system. Similarly, the satellite 120 and the satellite terminals 130a and 130b can also include subsystems that include multiple software and hardware components.

In addition, the subsystems and the components of the gateways 110a, 110b, the satellites 120, and the terminals 130a, 130b can also have multiple instances of software processes that implement the subsystems or components. For example, a satellite gateway can include one or more IP traffic handling components, satellite forward channel handling components, and satellite return channel handling components, just to name a few of the components. The satellite gateway can also include multiple instances of the IP traffic component to handle traffic of each channel of each satellite beam.

The satellite gateways 110a and 110b exchange data with the computer system 140. The computer system 140 can be, for example, one or more server systems that obtain data related to the satellite communication network. The gateways 110a and 110b exchange data with the computer system 140 over the communication network 105. The network 105 can include any combination of wired and wireless networks. For example, the network 105 can include one or more of a local area network (LAN), a wide-area network (WAN), the Internet, a broadband network, a fiber-optic transmission network, a cable network, Ethernet, Wi-Fi, a wireless data network, or other wired or wireless means for electronic data transmission. The computer system 140, voice server 150, and client device 104 can also exchange data over the network 105.

The computer system 140 also exchanges data with a client device 104. The client device 104 can be, for example, a computer workstation or other computing device connected to the computer system 140, e.g., through a network that enables two-way electronic communications. The client device 104 can also be a mobile computing device, such as a tablet computing device, a smart phone, a laptop computer, a smart watch, an electronic assistant or smart speaker, or another mobile computer. In some implementations, the client device 104 communicates with the computer system 140 via a wireless network connection. The client device 104 includes one or more microphones, which can detect utterances spoken by the operator 102. The client device 104 can also include one or more speakers, which enable playback of a synthesized speech voice response.

In stage (A), the operator 102 speaks a voice query 103 that is detected by the microphone of client device 104. The operator 102 can speak the voice query 103 as he would speak to another person, in colloquial, conversational language. The voice query 103 generally need not include a specialized syntax or word order beyond those of standard language usage.

Examples of the voice query 103 can include questions relating to the satellite communication system. For instance, the voice query 103 can include a question about a present condition of the system, a performance of a particular subsystem, a status of a particular component, or another statistic or property of the system. The query 103 can relate to a previous condition, status, performance metric, statistic, or property of the system (e.g., requesting the average hourly data traffic during the previous 24 hours).

The voice query 103 can request a particular metric, e.g., "What is the traffic on satellite beam A right now?" The voice query 103 can also request a relative metric, e.g., "Is the traffic on satellite beam A higher than it was at this time yesterday?"

The voice query 103 can include questions and statements related to troubleshooting problems within the communication system. For example, the query 103 can ask whether a particular problem has been observed on this network in the past, or if the problem has been observed on another similar network. The query 103 can also request recommendations for correcting or mitigating a particular problem.

The voice query 103 can also include instructions or commands that alter the operation of the satellite communication system. For example, the query 103 can include an instruction to reset a subsystem, to initialize a component, to run a script, or to adjust a parameter of the satellite communication system.

In the example of FIG. 1, the operator 102 utters the voice query 103, "Is there a problem with beam A?" Based on the detected voice query 103, the client device 104 generates the query audio data 107, which includes data representing the audio content of the query 103. In some implementations, the voice query 103 can be preceded by a "hotword" or "wake-up word" that signals to the client device 104 that a query for the VNA will follow.

The client device 104 provides the query audio data 107 to the voice server 150. The voice server 150 can be one or more computer systems (e.g., a server system) that provide speech recognition services for the system 100. In some implementations, the voice server 150 can be a third-party system (e.g., hosted on a cloud-computing platform and accessible via the Internet) that performs speech-to-text conversion of the query audio data 107. In some implementations, the client device 104 provides the query audio data 107 to the computer system 140, which in turn provides it to the voice server 150 (e.g., via an Internet connection). In some implementations, the voice server 150 may be part of the computer system 140.

The voice server 150 can include a natural language processing (NLP) engine, which interprets the audio content of the query audio data 107 to generate the current query data 151. The current query data 151 can include a transcript of the audio content of the query audio data 107, e.g., a transcript of the voice query 103 generated by a speech recognition processor of the NLP engine. In some implementations, the NLP engine may detect and identify a wake-up word in the query audio data 107. The NLP engine may use the identified wake-up word to direct interpretation of the query audio data 107. For example, if the identified wake-up word indicates that the voice query 103 is regarding a particular network, subsystem, or component, the NLP engine can adjust the interpretation of the query audio data 107 to increase the likelihood that the speech recognition processor associates a particular audio signal with a word related to the particular network, subsystem, or component indicated by the wake-up word.

The current query data 151 can also include a general intent of the query 103, where the general intent describes a broad purpose for, or topic of, the query 103. For example, the general intent of the query 103 can indicate that the query 103 pertains to a particular communication subsystem (e.g., to "beam A") or to a particular performance parameter (e.g., network traffic, packet drops). In some implementations, the voice server 150 may use the wake-up word to determine the general intent of the query.

To determine the general intent of the query 103, the voice server 150 can include a vocabulary 152 and an intent register 154. The vocabulary 152 can include a list of one or more keywords or key phrases that are associated with operation of the satellite communication system, such as system descriptors, (e.g., a system identifier, a location, a manufacturer), system components (e.g., "network," "beam," "gateway," "terminal," particular subsystems), performance metrics (e.g., "traffic," "beam drops," "packet drops," "errors") or other words and phrases relevant to the operation of the satellite communication system.

The vocabulary 152 can be provided to the voice server 150 by the computer system 140, e.g., via a network connection, when the VNA service is registered with the voice server 150. In some implementations, the computer system 140 can provide periodic updates for the vocabulary 152 to the voice server 150.

Based on the transcript of the query audio data 107 and the identified keywords and key phrases, the voice server 150 can determine a general intent of the voice query 103. In some implementations, the voice server 150 includes an intent register 154, which maps a set of one or more identified keywords and key phrases to one or more general intents. The general intent can describe a broad purpose for, or topic of, the query 103. For example, the general intent can indicate a particular system, subsystem, or component; a type of query (e.g., status request, command, troubleshooting request, information request); or another purpose or topic. For example, the intent register 154 may map the keyword "problem" to a general intent "status inquiry." This processing by the voice server 150 can alternatively be performed by the computer system 140 after receiving the transcript of the operator's request.

In stage (C) the voice server 150 provides the current query data 151 to the computer system 140. As described above, the current query data 151 can include the transcript of the voice query 103, as well as the determined general intent of the query 103 and any other data associated with the voice query 103. In some implementations, the computer system 140, rather than the server 150, determines the general intent of the query 103, e.g., based on the transcript of the voice query 103 provided by the voice server 150. The computer system 140 can store the current query data 151 in a query database 124, which can, for example, reside in a network attached storage (NAS) device.

The computer system 140 can process the current query data 151 to interpret the query, analyze the query results, and generate an output response to the voice query 103. To perform these functions of the VNA service, the computer system 140 includes an analytics module 146, which in turn can include multiple hardware and software components (e.g., multiple processing units, memory elements, software applications, etc.). The analytics module 146 can include one or more trained machine-learning models that are used to interpret the query 103, analyze the query results, and/or generate the output response to the query 103.

In stage (D), the computer system 140 provides the query data 153 to the analytics module 146. The query data 153 includes the current query data 151, which includes at least a transcript of the operator's query 103 and a general intent of the query 103. In some implementations, the query data 153 also includes (or the analytics module 146 otherwise has access to) historical query data, where the historical query data includes data related to previous queries processed by the VNA. For example, the historical query data can include transcripts of previous queries, general and/or refined intents of previous queries, analysis results of previous queries, and/or previously-generated responses to previous queries. These can be previous queries in the same session, allowing for continuity in conversing about a topic. Similarly, there can be records of queries from previous sessions, to better understand the user's general preferences.

In some implementations, the historical query data relates to previous queries for the same satellite communication system that is processing the current query data 151. In some implementations, the historical query data can relate to previous queries for another satellite communication system (e.g., a separate, but similar, communication network). The analytics module 146 can receive the historical query data from the query database 124 or from another storage device of the computer system 140.

In stage (E), the analytics module 146 accesses network data indicating current or previous status information for the satellite communication system. For example, the module 146 can receive current network data 143 generated by one or more data collection and processing modules 142 of the computer system 140, as well as context data 123 from a database 126.

The data collection and processing modules 142 receive information from the satellite communication system and prepare the information for input to the machine learning models of the analytics module 146. The modules 142 can receive information from various subsystems, hardware components, software components, and software instances of the communication system. For example, the modules 142 can receive information including status data (e.g., active, inactive, error state, etc.), metrics and statistics (e.g., current data transmission speeds, peak data transmission speeds, the number of items in a queue, number of dropped packets, average network traffic, peak network traffic, etc.), error and alarm data, error rates, and/or other appropriate information about the status or operation of the system or of one or more subsystems or components.

As the information from the satellite communication system can include many different types of information, the data collection and processing modules 142 can convert the information to an appropriate (e.g., common) format for the machine learning models. For example, the modules 142 can convert any non-numerical data to numerical data that represents the non-numerical data. The modules 142 can convert each type of non-numerical data to numerical data using a conversion function. For example, information specifying whether an alarm is present can be converted to a zero if the alarm is not present or to a one if the alarm is present.

In some implementations, the data collection and processing modules 142 aggregate a portion of the satellite system information. The modules 142 can aggregate information based on component type, location in the satellite communication system, and/or the type of information. For example, if there are multiple instances of a same type of component (e.g., multiple instances of an IP traffic handling subsystem) for a same gateway or same beam, the modules 142 can aggregate (e.g., by averaging, convex summation, or another appropriate aggregation technique) the various data about the IP traffic handling subsystem across each instance.

The data collection and processing modules 142 can also normalize the information received from the satellite communication system. For example, the modules 142 can normalize each piece of information such that the value of each piece of information has a value within a particular value range, e.g., between zero and one inclusive.

Based on the information received from the satellite communication system, the data collection and processing modules 142 provide to the analytics module 146 the current network data 143, which can include all or some of the information received from the satellite communication system that has been prepared for the machine learning models. The modules 142 can also provide some or all of the information received from the satellite communication system, including the current network data 143, to a network database 126 for storage. The database 126 can, for example, reside in a NAS device. In some implementations, the network database 126 may be the same database as the query database 124 or be stored in the same NAS device as the query database 124.

The analytics module 146 can also receive context data 123, e.g., from the network database 126. The context data 123 received by the analytics module 146 can include historical network data, e.g., data related to the satellite communication system of FIG. 1, but which was collected or generated at an earlier time. For example, the historical network data can include status, operational, and performance data for the communication system from a previous time period (e.g., performance data collected yesterday, last week, or last month).

The context data 123 can also include data related to other communication systems or networks. For example, the context data 123 can include status, operational, and performance data for a separate, but similar, communication system from a previous time period. The separate, but similar, communication system may, for example, have an architecture similar to the satellite communication system of FIG. 1, but be situated in a different geographic location or have a different number of gateways.

In some implementations, the context data 123 can also include data related to the operator 102 who uttered the voice query 103. For example, the context data 123 can include a level of training or expertise of the operator 102, a level of permission or data access of the operator 102, or particular speech patterns or a vocabulary of the operator 102. In some implementations, the context data 123 can include data related to previous queries of the operator 102, e.g., from the query database 124.

In stage (F), the analytics module 146 analyzes the query data 153, the current network data 143, and the context data 123 to (i) interpret the query 103, (ii) analyze the query results, and (iii) generate one or more output responses 185 to the voice query 103 based on the analysis results. The processes performed by the analytics module 146 are described in greater detail in FIG. 2.

The analytics module 146 can include one or more machine learning models for performing the above functions. For example, the analytics module 146 can include one or more machine learning models that output a refined intent for the query. The refined intent can indicate a more specific topic or purpose of the query 103 than that indicated by the general intent of the current query data 151. For example, if the voice query 103 is "Is there a problem with beam A?", the general intent may be "status of beam A," and the refined intent may be "determine error status of beam A" or "determine if beam A traffic is outside of a normal range."

The refined intent can be determined by one or more machine learning models that receive as input the query data 153, which includes the current query data 151 (e.g., the query transcript and the general intent), as well as historical query data. In some examples, the machine learning models can determine the refined intent based solely on the current query data 151. In other examples, the machine learning models may use information related to previous queries to determine the refined intent and/or resolve any ambiguities. For example, if the current voice query 103 is "Is there a problem with the beam?", the analytics module 146 may not be able to determine which beam is referenced by the query based on the query 103 alone. However, if the voice query received immediately prior to the query 103 asked "What is the current traffic on beam A?", the machine learning models can determine that "the beam" referenced by the current voice query 103 indicates "beam A," as well.

In some implementations, the machine learning models use context data 123 that includes historical network data for the communication system, historical data for other similar networks, data related to the operator 102, and/or other context data to refine the query intent. For example, if the current voice query 103 asks "Is there a problem with beam A?" the machine learning models may determine from historical network data that problems with beam A are often associated with a lower-than-normal level of beam A traffic. As a result, the machine learning models may determine that the refined intent of the query 103 is "determine whether the current beam A traffic is outside of a normal range for beam A traffic at this time of day."

In some implementations, the machine learning models use the current network data 143 to refine the query intent. For example, if, as above, the voice query 103 asks "Is there a problem with beam A?" and the current network data 143 indicates that beam A is currently dropping packets at a rate greater than a particular average threshold, the machine learning models may determine that the refined intent of the query 103 is "determine whether the current beam A packet drops are outside of a normal range of packet drops for beam A."

The machine learning models of the analytics module 146 are not limited to using only one type of input data, but can use any combination of query data 143, current network data 143, and context data 123 to refine the query intent.

Each machine learning model used by the analytics module 146 can be any of various types, such as neural network, a maximum entropy classifier, a decision tree, an XG boost tree, a random forest classifier, a support vector machine, a logistic regression model, K-nearest neighbors, or another model type.

The analytics module 146 can train the machine learning models using labeled query data 153, labeled current network data 143, and labeled context data 123. In some implementations, the training examples used to train the machine learning models can include labeled query data and network data obtained from other satellite communication networks. The training examples used to train the machine learning models can include a subset of the labeled data, e.g., a subset of data selected by a user.

The training process alters the parameters of the machine learning models so that the models learn internal functions or mappings between sets of input data, e.g., input data derived from the labeled query data 153, labeled current network data 143, and labeled context data 123, and potential output refined intents.

In some implementations, multiple machine learning models can be trained and used to determine a refined intent for the query 103. In this example, each machine learning model can be different and the machine learning outputs of the machine learning models can be combined (e.g., by polling, a weighted sum, or another aggregation technique) to determine a most likely refined query intent. The machine learning models can be trained differently and/or be of different types (e.g., one or more neural networks and one or more random forest classifiers). The machine learning models can be trained differently by using different parameters (e.g., different tuning parameters, optimizers, or layers) and/or using different subsets of the labeled network component information. For example, the machine learning models of the analytics module 146 can include neural networks that have different numbers of layers and/or that have been trained using different subsets of the labeled data.

Based on the refined query intent, the analytics module 146 interprets the query 103 and retrieves any necessary query results. For example, the module 146 may determine that the query 103 is asking whether beam A traffic is outside of a normal range. The module 146 can then determine that it must retrieve data, e.g., the query results, indicating current and historical beam A traffic to respond to the query 103. The module 146 can retrieve the query results from the current network data 143, the query data 153, or the context data 123 (e.g., historical data for the network of FIG. 1 or data for a separate network). In some examples, the module 146 may retrieve the query results from another data source, e.g., from the query database 124, the network database 126, or another connected database or NAS device. For example, if the query 103 requests a definition or a description of a problem, the module 146 may retrieve the definition or problem description from a knowledge database stored in a NAS device.

Based on the query data 153, the current network data 143, and/or the context data 123, the analytics module 146 analyzes the query results and generates one or more output responses 185. The analytics module 146 can also include one or more machine learning models for analyzing the query results and generating the responses 185. The machine learning models can be any of various types and can be trained using labeled query data 153, labeled network data 143, and labeled context data 123. In some implementations, multiple machine learning models output an analysis result and/or a response and the outputs are combined (e.g., by polling, a weighted sum, or another aggregation technique) to determine the response 185 output by the analytics module 146.

In some implementations, the machine learning models can analyze the query results, the query data 153, the current network data 143, and/or the context data 123, to determine a current condition (e.g., an operational readiness, a problem, a degradation) of the satellite communication system, a potential future condition of the system (e.g., entering a degraded state), a status (e.g., enabled, disabled, degraded, error) of a subsystem or component of the network, a performance metric or statistic of the network or subsystem, or another system property. For example, the machine learning models can determine that the communication system is fully-operational or operating in a degraded condition. The models can also determine that a particular component is operating outside of a specified normal range, or that a subsystem is in an error state.

Based on the determined condition, status, metric, or property, the machine learning models of the analytics module 146 generate one or more output responses 185. In some implementations, the analytics module 146 can again use machine learning models to generate the response 185. In some implementations, the analytics module 146 can additionally or alternatively use a rules-based engine to generate the response 185.

The response 185 can include a message 181. The message 181 can include, for example, a text transcript for a synthesized speech response 159 to be provided to the operator 102, e.g., through a speaker of the client device 104. The message 181 can include data, statistics, or status information related to the satellite communication network (e.g., in response to the query 103). In some implementations, the message 181 can prompt the operator 102 to perform a particular operational step, e.g., initializing a component, executing a particular script, or adjusting a software setting. In some implementations, the response 185 includes a series of multiple messages 181 that guide the operator through a sequence of operational steps to achieve a desired network operation.

In some implementations, the message 181 can indicate to the operator 102 additional information that the analytics module 146 determines may be relevant to the voice query 103. For example, the voice query 103 may be "What is wrong with beam A?" Based on analyzing the query data 153, the current network data 143, and the context data 123, the analytics module 146 may determine that beam A is currently experiencing a high number of packet drops and that beam B is also experiencing a similarly high number of packet drops. As a result, the analytics module 146 may output a message 181 indicating the similarity and asking whether the operator 102 would like more information about the high number of packet drops by beam B.

In the example of FIG. 1, in stage (G), the computer system 140 provides the message 181 to the voice server 150, where the message 181 includes text for the synthesized speech response 159. Based on the text, the voice server 150 synthesizes the message signal 157, which includes audio content of the message 181. In stage (H), the voice server 150 provides the message signal 157 to the client device 104 and in stage (I), the speakers of the client device 104 playback the message signal 157 to generate the synthesized speech response 159 for the operator 102.

In some implementations, the message 181 includes a visual message. The visual message can include, for example, charts, tables, or graphs plotting various network data related to the voice query 103, or a sequence of operational steps for the operator 102 to perform. In these examples, the computer system 140 and/or voice server 150 can provide the data for displaying a visual message to the client device 104, e.g., for display in a graphical user interface of the display of the client device 104.

The response 185 generated by the analytics module 146 in stage (F) can also include one or more network actions 183 that alter the operation of the satellite communication system. For example, the voice query 103 may ask "Is there a problem with beam A?" The analytics module 146 may analyze the query data 153, the current network data 143, and the context data 123 to determine that beam A is experiencing an unusually high number of packet drops and that a similar problem in beam A yesterday was corrected by adjusting the settings for beam A. As a result of the analysis, the analytics module 146 may include as part of the response 185 a recommended network action 183 to adjust the settings for beam A.

In some implementations, the analytics module 146 provides the recommended network action 183 to the operator 102 by including a text description of the action 183 in the message 181, e.g., for synthesized speech output or for display in a graphical user interface of the client device 104. In some implementations, the message 181 may request permission from the operator 102 for the computer system 140 to perform the recommended network action 183.

In some implementations, the computer 140 automatically causes the output network action 183 to be performed. For example, the computer system 140 can send an instruction to a subsystem, a hardware component, or a software component of the satellite communication system to adjust a parameter, reset a component, capture data, or perform another operation. As shown in stage (J) of the example of FIG. 1, in some implementations, the computer system 140 can provide the network action 183, or an instruction to perform the network action 183, to one or more components of the satellite communication system through the network 105.

In some implementations, the analytics module 146 can restrict the data it processes or the information it provides in the message 181 based on an indicated identity of the operator 102 that uttered the voice query 103. For example, as described above, the current query data 151 that is part of the query data 153 processed by the analytics module 146 can include information identifying the operator 102 that uttered the query 103 (e.g., based on a username, password, ID number, identifying information for the client device 104, or other authentication information). Based on the data indicating an identity of the operator 102, the analytics module 146 can limit the information it provides in the message 181 to only the information that the indicated operator 102 has access to (e.g., provide information for only a particular network, or network subsystem)

Though described above in a particular order, other sequences of stages (A) through (J) are possible and within the scope of the disclosure. For example, in some implementations, the analytics module 146 can receive the current network data 143 and/or the context data 123, i.e., stage (E), before receiving the query data 153, i.e., stage (D). In some implementations, the system may perform a subset of stages (A) through (J). For example, the system 100 may determine a network action, but not automatically perform the network action (e.g., omitting stage (J)). As another example, the system 100 may generate an output network action 183, but may not output or generate a synthesized speech response 159 (e.g., omitting stages (G) through (I)).

In some implementations, some or all of stages (A) through (J) may be repeated, such that the operator 102 and the VNA of the computer system 140 exchange a series of voices queries 103 and responses 185. In these examples, the exchanges between the VNA of the computer system 140 and the operator 102 can be conversational in nature, where the exchange is a dialogue between the VNA and the operator 102.

Figure 2:
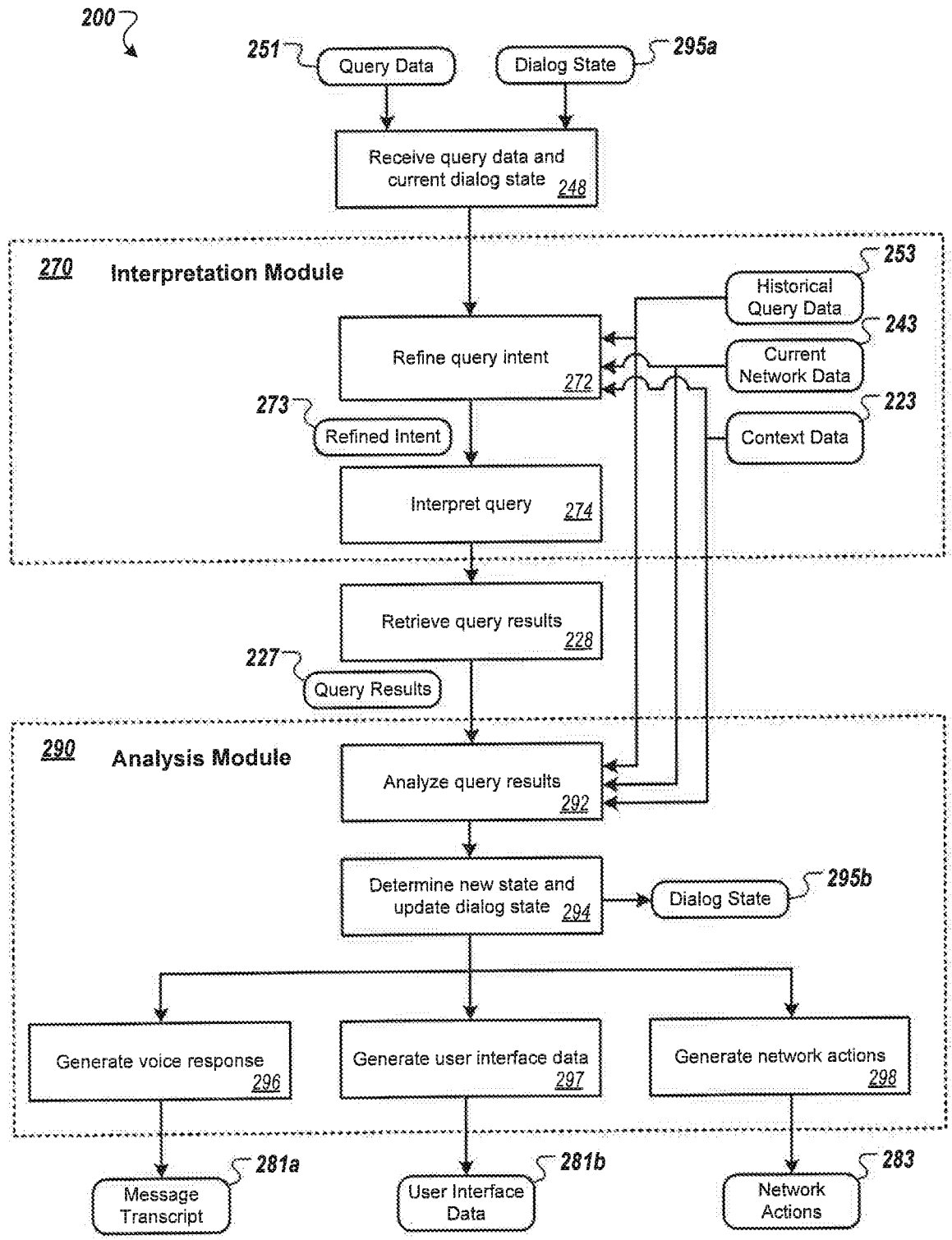
FIG. 2 is a diagram that illustrates an example of a process for spoken language interface to a satellite communication system.

FIG. 2 is a diagram that illustrates an example of a process 200 for spoken language interface to a satellite communication system. The process 200 can be performed, for example, by the analytics module 146 of the computer system to analyze a received voice query. The process 200 can also be performed to analyze a series of voice queries (e.g., a dialogue between a VNA of the computer system and an operator). The VNA of the computer system may perform the operations of process 200 after receiving data indicating a voice query, e.g., after receiving the current query data 151 of FIG. 1.

In brief, in process 200, the computer system receives query data 251 related to a current voice query and a current dialogue state 295a (248). The computer system refines the intent of the voice query (272) and interprets the query (274). After interpreting the query, the system retrieves the query results (228). The system then analyses the query results (292), updates the dialogue state to a new dialogue state 295b (294), and generates one or more output responses (296, 297, 298), where the output responses can include a message text 281a for a synthesized speech response, user interface data 281b for a visual message response, and one or more network actions 283.

In more detail, after the operator utters a voice query, the computer system receives or accesses query data 251 and a current dialogue state 295a (248). The query data 251 can include a transcript of the voice query and a general intent of the query (e.g., the query data 251 can be the current query data 151 of FIG. 1). The current dialogue state 295a can be, for example, a value that the computer system maintains to monitor the progression of a dialog, e.g., an exchange of a series of voice queries and responses, between the computer system and the operator. The value of the current dialogue state 295a can be set by the computer system to reflect the previous voice queries and responses in the exchange. For example, the computer system may update the dialogue state 295a to a new value after each exchange. In some implementations, the computer system may set the dialogue state 295a to an initialization state, for example, if there are no prior voice queries or if the system has determined that the dialogue state 295a should be reset (e.g., at the start of a new operator's shift).

In some implementations, the computer system includes an interpretation module 270 for interpreting the query. After receiving the query data 251 and current dialogue state 295a, the interpretation module 270 can refine the query intent (272). To refine the query intent, the module 270 may analyze the current query data 251, the dialogue state 295a, historical query data 253, current network data 243, and other context data 223 to generate a refined intent 273 of the query, where the refined intent 273 provides an indication of the specific purpose and/or topic of the voice query.

The historical query data 253 includes information related to previous queries for the network. For example, the historical query data 253 can include a list of the previous queries most recently received by the module 270. The historical query data 253 can also include a list of previous queries related to the same network component, or with the same general query intent. The historical query data 253 can include previous network queries that include one or more keywords or key phrases identified in the current query data 251.

The current network data 243 can include information received from or generated by one or more elements of the satellite communication system. For example, the current network data 243 can include status data (e.g., active, inactive, error state, etc.), metrics and statistics (e.g., current data transmission speeds, peak data transmission speeds, the number of items in a queue, number of dropped packets, average network traffic, peak network traffic, etc.), error and alarm data, error rates, and/or other appropriate information about the current status or operation of the system or of one or more subsystems or components of the communication system.

The context data 223 can include, for example, historical network data from the communication system that is processing the query, historical network data from another communication system, data related to the operator that uttered the voice query, or other context data (e.g., location data, weather data, environmental data, etc.).

The interpretation module 270 can be implemented using machine learning models of various types, such as neural networks, decision trees, a support vector machine, or another model type as described above for FIG. 1. In some implementations, the outputs of multiple models can be combined to generate a refined intent 273 of the query.

Based on the refined intent 273 and the query data 251, the interpretation module 270 interprets the query (274). In some implementations, based on interpreting the query, the module 270 generates a query command for a database (e.g., the query database 124 or network database 126 of FIG. 1, a knowledge database, or another database accessible by the system). In some implementations, based on interpreting the query, the module 270 determines that additional information is needed from the operator to generate a query command or another action.

If the module 270 has generated a query command for a database, after interpreting the query, the computer system retrieves the query results 227 (228). For example, the module 270 may retrieve current or historical performance data for the network from a network database. The module 270 may retrieve historical performance data for another, different network. The module 270 may retrieve component or system information (e.g., definitions, descriptions, version information) from a knowledge database. For some queries, the module 270 may retrieve multiple types of data, or data from multiple databases. For example, after interpreting the query data 251, the module 270 may retrieve current network and historical performance data so that it can compare a current network performance to past network performance.

The computer system can also include an analysis module 290. The analysis module 290 analyzes the query results 227, for example, by using one or more machine learning models (292). The machine learning models can receive as input the query results 227 and additional data that can include the current query data 251, the current dialogue state 295*a*, as well as some or all of the historical query data 253, the current network data 243, and the context data 223.

In some implementations, the analysis module 290 analyzes the query results 227 to determine a condition (e.g., an operational readiness, a problem, a degradation) of the satellite communication system or a potential future condition of the system (e.g., entering a degraded state, recovering from a degraded state). The analysis module 290 can also analyze the query results 227 to determine a status (e.g., enabled, disabled, degraded, error) of a subsystem or component of the network, a performance metric or statistic of the network or subsystem, or another system property.

Based on the analysis of the query results 227, the analysis module 290 determines a new dialogue state 295*b* and updates the current dialogue state 295*a* to the new state value (294). The updated dialogue state value is then used as the current dialogue state 295*a* for analyzing the subsequent voice query. By updating the dialogue state 295*a* after analyzing each query, the particular sequence of previous queries can impact the interpretation of a given query. An example of a progression of the current dialogue state for a series of voice queries (e.g., a dialogue between the VNA and the operator) is described in FIG. 3.

Also based on the analysis of the query results 227, the analysis module 290 generates one or more output responses for the system. In some implementations, the module 290 generates the one or more output responses before updating the dialogue state.

In some implementations, the analysis module 290 generates a response by generating a message text 281*a* for a voice response of the system (296). For example, the message text 281*a* can include data related to the satellite communication system, information about one or more components of the system, and/or a recommended network action for the system. For some responses, the message text 281*a* can request information from the operator (e.g., request permission to perform a network action, or request additional information to interpret the query). The message text 281*a* can be provided by the computer system of the satellite communication system to a voice server (e.g., the voice server 150 of FIG. 1), which can generate an audio signal that is played-back to the operator through the operator's client device, terminal, work-station, or other computing device.

In some implementations, the analysis module 290 can, in addition or alternatively, generate user interface data 281*b* as a response (297). The user interface data 281*b* can include, for example, one or more visual messages to be provided to a client device, terminal, work-station, or mobile computing device for display in a graphical user interface. The user interface data 281*b* can include text messages, images, system diagrams, charts, graphs, and other representations of data. In some implementations, the user interface data 281*b* can include interactive controls for receiving a response from an operator. For example, the user interface data 281*b* can include menus, buttons, fields, or other controls in a graphical user interface that are selectable by an operator (e.g., by a mouse-click or touchscreen contact).

The analysis module 290 can also generate for output one or more network actions 283 that alter operation of the communication system (298). For example, the module 290 can generate actions 283 that include sending an instruction to a subsystem, a hardware component, or a software component of the satellite communication system to configure the component, to adjust a parameter, to reset a component, to capture data, or to perform another operation. For some responses, the module 290 can generate actions 283 that store data in a database, alter a stored data value, update a configuration file, run a software application, or execute a script.

As described above, to analyze the query results 227 and generate the output responses, the module 290 can use one or more machine learning models. For example, the machine learning models used by the analysis machine learning module 290 can include models of any of various types, including as neural networks, decision trees, a support vector machine, or another model type as described above for FIG. 1. In some implementations, the outputs of multiple models can be combined (e.g., by polling, by a weighted sum, etc.) to determine the new dialogue state 295*b* and to determine the one or more out responses.

Figure 3:
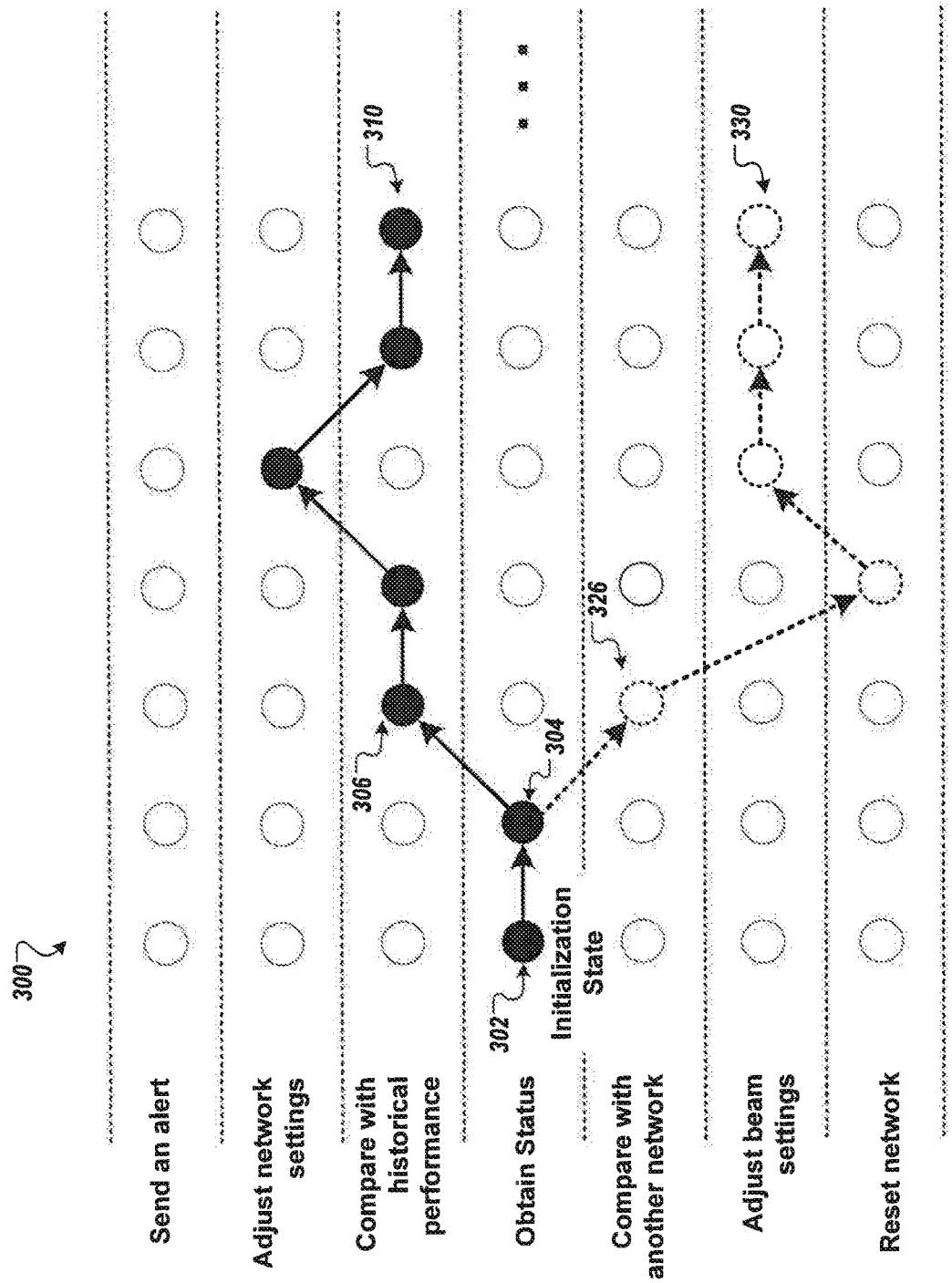
FIG. 3 is a diagram that illustrates an example of a progression of a dialogue in a spoken language interface to a satellite communication system.

FIG. 3 is a diagram that illustrates an example 300 of a progression of a dialogue in a spoken language interface to a satellite communication system. The example 300 maps the progression of the dialogue state during an example series of voice query-response exchanges between an operator and a VNA of a computer system of a satellite communication system. In FIG. 3, each circle in the grid represents a potential dialogue state. The horizontal lanes indicate different categories of dialogue states.

In the example of FIG. 3, the dialogue states are categorized by a type of user request or action to be performed (e.g., obtain a status, compare with another network, adjust beam settings, etc.). The VNA system can have multiple different predetermined tasks or workflows defined, each with a progression of dialogue states that can be used to accomplish the task or proceed through the workflow. Some lanes or progressions may correspond to actions that the VNA system recommends, based on the analysis of input from the user and current and prior context of the satellite communication system and associated networks. In general, individual dialogue states and sequences of dialogue states need not be associated with an action type, but may be categorized or arranged in various ways (e.g., for a task, a workflow, an action, a component, a subsystem, a type of query, a query intent, a query order). In some implementations, the dialogue states are not associated with any category (e.g., the dialogue state may be an abstract state).

Each dialogue state can have an associated set of content used to interpret requests and to generate messages and visual user interface content to respond to users. For example, the dialogue state 302 may represent a user requesting information about the current status of the satellite communication system. Various queries, such as "what is the current status?," "what is going on with the system now?," "any changes in the network today?," and may others may map to this initial state. Selecting a state may be part of interpreting a query, or may be done as a result of interpreting a query. The VNA system selects an appropriate dialogue state as discussed further below, then generates a response based on the content for that state. Dialogue states may have predefined messages to select from and send, or may have grammars indicating message structures and phrases with fields that are filled based on current information.

The VNA system, when interpreting a query, may determine an appropriate dialogue state from among the many dialogue states that have been defined. Different dialogue states may have keywords, query intents, and other content associated with them to better determine whether a query matches the state. Based on the similarity (e.g., degree of match) between words in a query and keywords for the respective dialogue states, the VNA system can assign scores to the dialogue states and select the highest-scoring dialogue state. Once a state is selected, the VNA system can also evaluate potential future paths for the conversation, and may steer the conversation by the way the system interacts with the user. In the example of FIG. 3, each of the horizontal lanes represents an ordered series of dialogue states, from left to right, for a different task, workflow, or action. As the dialogue proceeds however, the user may change his interest to a different task, and the VNA system can detect that and shift to the dialogue state progression for a different task.

In many cases a user may not know which task to carry out, and the VNA system can suggest actions or topics that move the dialogue to a different dialogue state progression. For example, if a user asks generally about status and the VNA system determines that an error condition is present, the VNA system can give the status information the user requested and also volunteer additional information about the error. Without the user asking, and based on the detected error, the system and ask if the user would like to find out more about the error or carry out an action to address the error. Depending on the user's response, the VNA system can shift to the appropriate series of dialogue states as needed, either to continue with general status information, to provide information about the error, to walk the user through a procedure for correcting the error, or to initiate settings changes for the satellite communication system to correct the error. Other types of situations where the VNA system may provide information not specifically requested from a user include automatic comparisons to prior performance or to other networks, giving the user additional context. Further, the VNA system may provide information about what has been done previously in similar situations. For example, if an error condition is present, the VNA system may determine whether the error has occurred before, and what was done in response, then include in a message to the user the information of what was done before. This may be provided as a recommendation, or as an offer for the VNA system to perform the action on the user's behalf.

To determine which dialogue state is appropriate, in addition to matching keywords of dialogue states to words in spoken user input, there may be contextual factors associated with dialogue states that are used to select which dialogue state is most applicable to the current user request. For example, the same user query may map to different dialogue states depending on the state of the network, previous recent requests and system outputs, or the long-term prior behavior of the user. A general query "What is going on?" might normally map to the general initial state representing a user requesting general status information. However, the VNA system may instead map this general query to a different or more specific dialogue state if the VNA system determines that the system is experiencing a significant error, or if a device associated with the user is displaying information about the error or decreasing network performance. These and other contextual factors may cause the system to respond to a query using the parameters and response content of a different dialogue state, for example, to discuss or address the error that the system detected, even if the user may not mention it or even know about it. As another option, the VNA system may include such a message as additional content appended to a response for a more general dialogue state, thus providing content that is a hybrid from that of multiple dialog states, e.g., one state based on the current user request, and one or more states for conditions or tasks that the system predicts may be of interest to the user based at least in part on the context of the satellite communication system.

In example 300, the filled circles and solid lines indicate a dialogue progression, e.g., the actual series of dialogue states that the VNA system selected and used to provide responses to a user. The dashed circles and dashed lines indicate a second, alternate dialogue progression that the VNA system predicted as a potential alternate path for the dialogue. The VNA system may generate scores or weightings for different transitions between dialogue states, updating the scores with each user response and with changes in the status of the satellite communication system. With this information the VNA system can both respond to changes to allow the dialogue to adapt, as well as include questions and comments that bias the dialogue toward specific tasks and workflows. In some implementations, once a task or workflow is determined to be requested by a user with at least a minimum level of confidence, the VNA system may assign scores or weightings to favor staying within the progression of states for that task or workflow. Nevertheless, as shown in FIG. 3, the VNA system can re-evaluate and shift from one task to the other as needed, allowing dialogues to follow a unique progression of states if appropriate.

Prior to receiving the first query, the dialogue state is an initialization state 302. The initialization state 302 can be, for example, a default dialogue state assigned by the computer system upon initialization of the VNA or when a new dialogue exchange is detected by the VNA. In the example of FIG. 3, the initialization state 302 corresponds to the "obtain status" action type. In some implementations, an operator can reset the VNA dialogue state to the initialization state 302, e.g., by providing a voice query indicating the dialogue should be reset.

In the example of FIG. 3, after receiving the first query and analyzing the first query results, the computer system recommends an action that requires obtaining additional status information and so updates the current dialogue state to the state 304, which also corresponds to the "obtain status" action type.

The computer system may determine the next dialogue state based on any of various factors, including the current dialogue state, the query data, the query results, the generated response, the current network status, the historical network status, network data for other systems, user data, or other context data. As described above in FIG. 2, the computer system can determine the next dialogue state using any of various methods, including any combination of rules-based approaches and/or machine learning techniques. In some implementations, the computer system may determine the next dialogue state differently for different current dialogue states, e.g., by using different machine learning models, machine learning models with different weights or optimizations, using different rules, etc.

In the example of FIG. 3, after receiving the second query and analyzing the second query results, the computer system recommends an action that involves comparing the network with historical performance of the network, and so updates the current dialogue state to the state 306. The progression continues similarly, with the computer system updating the dialogue state after each query, as indicated by the filled black circles and the solid arrows. After the sixth query, the current dialogue state is state 310.

Because the computer system updates the dialogue state based on various factors, the dialogue state may progress differently for different series of queries, different query results, different operators, and so on. In FIG. 3, the dashed arrows indicate a second example progression. The second progression begins similarly to the first, starting at the initialization state 302 and progressing to dialogue state 304 after the first query. However, in the second example progression, after analyzing the results of the second query, the system recommends comparing the network with another, separate network. As a result, rather than updating the current dialogue state from state 304 to state 306 (e.g., as in the first example progression), the system updates the current dialogue state from state 304 to state 326. The second progression could occur, for example, if the results of the second query indicated that no data of the desired type was available for the present network. The second progression continues similarly, with the computer system updating the dialogue state after each query, as indicated by the dashed circles and the dashed arrows, with the dialogue in state 330 after the sixth query.

By updating the dialogue state after each query, the computer system can direct or nudge the operator toward a desired result. For example, the computer system can step the operator through various stages of training or troubleshooting, or to inform or alert the user of conditions that the user was not aware of.

In some implementations, the VNA system coordinates with the display of visual information on a user interface. For example, an application for viewing and/or changing satellite communication system settings and status may be able to provide real-time or near-real-time reports, e.g., statistics, charts, graphs, maps, etc. showing the performance of the satellite communication system. The application may be on a mobile device, desktop computer, laptop computer, or other type of networked client device, and may be different from and independent of the device that detects and receives the user's queries in the dialogue. The application can provide information, over a communication network (or directly if co-located with the device that receives user queries), that indicates the state of the application, e.g., what is visible on the user interface at a given time. Information may be provide at various levels of granularity, such as keywords or topics, or specific user interface elements, controls, or user interface events. For example, the application may indicate that a chart is currently shown, and may indicate the names of the axes, the data series being shown, the actual data points or trends shown, the colors of different items, and so on. With this information, when a user asks about elements on the user interface, such as "what does the red line represent?" or "why is traffic greater today than yesterday?" the VNA system can interpret the query in the context of the information the user is concurrently viewing and provide an accurate response.

Similarly, the VNA system may use the same type of communication link to initiate display of information on the application. For example, in response to a user query about a task, the VNA system may send information triggering the application on a client device to display a list of steps for the procedure. As another example, in response to a user query, the VNA system may send information causing the client device to show a chart, and then refer to the chart that the VNA system initiated to be displayed, e.g., "the performance of the network has improved as shown by the increasing trend of the green line in the chart . . . ." Thus, the VNA system can adapt its interpretation of queries and its responses to queries based on the state (e.g., user interface display) of other devices, and may change the state of the other devices in order to provide concurrent audio and visual output to the user.

Figure 4:
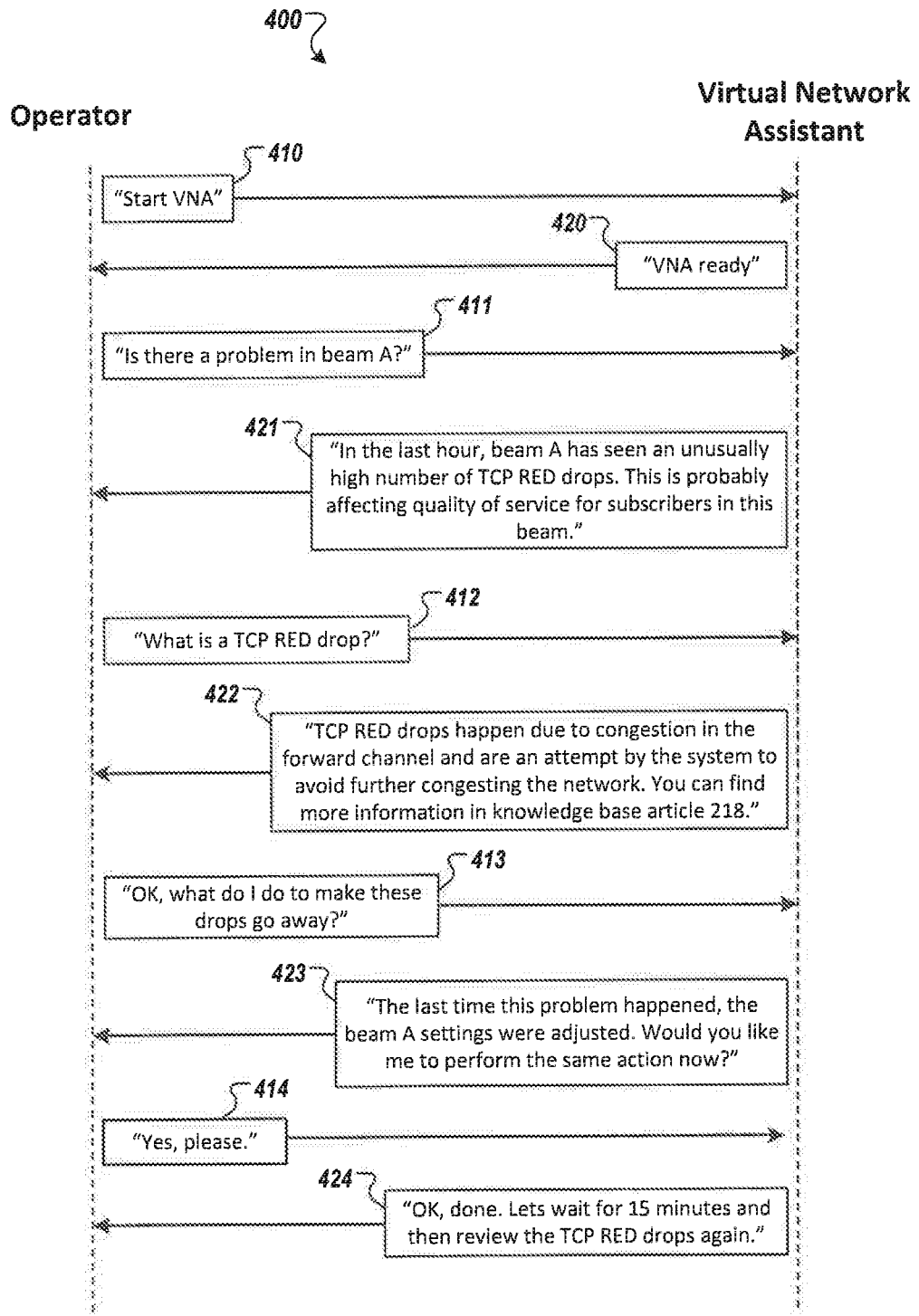
FIG. 4 is a diagram that illustrates an example of a dialogue exchange using a spoken language interface to a satellite communication system.

FIG. 4 is a diagram that illustrates an example of a dialogue exchange 400 using a spoken language interface to a satellite communication system. The dialogue exchange 400 includes a series of voice queries 410 through 414 uttered by an operator and a series of responses 420 through 424 generated by a virtual network assistant (VNA), such as the VNA of a computer system of a satellite communication system. The dialogue exchange 400 is an example of troubleshooting a network communication problem using the VNA.

The operator begins a dialogue with the VNA by uttering the voice query 410, "Start VNA." After receiving and analyzing the voice query 410, the VNA generates the response 420, indicating that the VNA is ready. The response 420 is provided to the operator, for example, as a synthesized speech response played-back by speakers of the operator's workstation.

After receiving the response 420, the operator and VNA exchange the series of voice queries 411 through 414 and responses 421 through 424. After each voice query 410 through 414 uttered by the operator, the VNA interprets and analyzes the voice query to generate the synthesized speech responses 421 through 424, respectively.

In addition to the synthesized speech responses, the VNA can also generate one or more network actions in response to the queries. For example, the VNA response 423 asks whether the system should adjust the settings of beam A, and the operator's voice query 414 confirms that the system should adjust the beam settings. As a result, the VNA's subsequent response 424 can include one or more network actions to adjust the settings of beam A.

Embodiments of the invention and all of the functional operations described in this specification may be implemented in digital electronic circuitry, or in computer software, firmware, or hardware, including the structures disclosed in this specification and their structural equivalents, or in combinations of one or more of them. Embodiments of the invention may be implemented as one or more computer program products, i.e., one or more modules of computer program instructions encoded on a computer-readable medium for execution by, or to control the operation of, data processing apparatus. The computer readable medium may be a non-transitory computer readable storage medium, a machine-readable storage device, a machine-readable storage substrate, a memory device, a composition of matter effecting a machine-readable propagated signal, or a combination of one or more of them. The term "data processing apparatus" encompasses all apparatus, devices, and machines for processing data, including by way of example a programmable processor, a computer, or multiple processors or computers. The apparatus may include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal that is generated to encode information for transmission to suitable receiver apparatus.

A computer program (also known as a program, software, software application, script, or code) may be written in any form of programming language, including compiled or interpreted languages, and it may be deployed in any form, including as a stand-alone program or as a module, component, subroutine, or other unit suitable for use in a computing environment. A computer program does not necessarily correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one computer or on multiple computers that are located at one site or distributed across multiple sites and interconnected by a communication network.

The processes and logic flows described in this specification may be performed by one or more programmable processors executing one or more computer programs to perform functions by operating on input data and generating output. The processes and logic flows may also be performed by, and apparatus may also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer may be embedded in another device, e.g., a tablet computer, a mobile telephone, a personal digital assistant (PDA), a mobile audio player, a Global Positioning System (GPS) receiver, to name just a few. Computer readable media suitable for storing computer program instructions and data include all forms of non-volatile memory, media, and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory may be supplemented by, or incorporated in, special purpose logic circuitry.

To provide for interaction with a user, embodiments of the invention may be implemented on a computer having a display device, e.g., a CRT (cathode ray tube) or LCD (liquid crystal display) monitor, for displaying information to the user and a keyboard and a pointing device, e.g., a mouse or a trackball, by which the user may provide input to the computer. Other kinds of devices may be used to provide for interaction with a user as well; for example, feedback provided to the user may be any form of sensory feedback, e.g., visual feedback, auditory feedback, or tactile feedback; and input from the user may be received in any form, including acoustic, speech, or tactile input.

Embodiments of the invention may be implemented in a computing system that includes a back end component, e.g., as a data server, or that includes a middleware component, e.g., an application server, or that includes a front end component, e.g., a client computer having a graphical user interface or a Web browser through which a user may interact with an implementation of the invention, or any combination of one or more such back end, middleware, or front end components. The components of the system may be interconnected by any form or medium of digital data communication, e.g., a communication network. Examples of communication networks include a local area network ("LAN") and a wide area network ("WAN"), e.g., the Internet.

The computing system may include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the invention or of what may be claimed, but rather as descriptions of features specific to particular embodiments of the invention. Certain features that are described in this specification in the context of separate embodiments may also be implemented in combination in a single embodiment. Conversely, various features that are described in the context of a single embodiment may also be implemented in multiple embodiments separately or in any suitable subcombination. Moreover, although features may be described above as acting in certain combinations and even initially claimed as such, one or more features from a claimed combination may in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems may generally be integrated together in a single software product or packaged into multiple software products.

Thus, particular embodiments of the invention have been described. Other embodiments are within the scope of the following claims. For example, the actions recited in the claims may be performed in a different order and still achieve desirable results.

What is claimed is:

1. A method performed by one or more computers, the method comprising:
   receiving, by the one or more computers, data indicating a transcription of a spoken request from a user of a voice-response interface for a satellite communication system, wherein the spoken request is detected by a client device and the transcription is generated by an automated speech recognizer;
   accessing, by the one or more computers, status information for the satellite communication system, the status information indicating current characteristics of the satellite communication system;
   interpreting, by the one or more computers, the request based on the transcription and the status information for the satellite communication system;
   generating a response to the request based on the status information for the satellite communication system;
   causing, by the one or more computers, a synthesized speech utterance of the response to be output by the client device in response to the spoken request;
   obtaining, during a conversational dialogue between the user and the voice interface that includes multiple rounds of interaction that each include (i) spoken user input and (ii) a response through the voice interface, content of different user interfaces successively displayed during the conversational dialogue; and
   generating and providing, for one or more of the responses through the voice interface, a particular response, based on the content of the successive user interface views, that refers to one or more user-selectable controls from among the set of user-selectable controls available to the user in the user interface view shown to the user when the particular response is output to the user.

2. The method of claim 1, wherein interpreting the request comprises determining that the transcription of the request comprises a predetermined keyword corresponding to a particular type of request.

3. The method of claim 1, wherein interpreting the request comprises receiving, from a server system that provides the automated speech recognizer, data indicating a request type that the server system determined based on the request.

4. The method of claim 1, further comprising:
   accessing data indicating a predetermined threshold for initiating a message over the voice-response interface, the predetermined threshold corresponding to a condition of the satellite communication system;
   determining, based on evaluation of one or more attributes of the status information with the predetermined threshold, that the predetermined threshold is satisfied; and
   in response to determining that the predetermined threshold is satisfied, initiating transmission of a message indicating the presence of the condition of the satellite communication system.

5. The method of claim 1, further comprising:
   determining that a condition of the satellite communication system is present;
   identifying a previous instance of the condition of the satellite communication system and one or more previous network management actions that removed the previous instance of the condition; and
   providing a message indicating the previous network management actions that removed the previous instance of the condition.

6. The method of claim 5, further comprising repeating the network management actions that removed the previous instance of the condition.

7. The method of claim 1, comprising providing, by the one or more computers and to the client device over a network, instructions causing display of a user interface indicating current or historical attributes of the satellite communication system;
   wherein generating the response comprises generating a response that refers to the current or historical attributes of the satellite communication system that the instructions caused to be displayed on the user interface.

8. The method of claim 1, wherein the method comprises accessing user interface data indicating content of the user interface displayed on the client device;
   wherein interpreting the request comprises identifying, based on the user interface data, one or more elements of the user interface displayed on the client device that are related to the request; and
   wherein generating the response to the request comprises generating a response that refers to one or more elements of the user interface.

9. The method of claim 1, wherein interpreting the request comprises determining that the request calls for a summary of events that have occurred in the satellite communication system;
   wherein generating the response comprises:
      identifying a time period;
      accessing log data indicating events for the satellite communication system over the time period;
      selecting a subset of the events in the satellite communication system based on one or more criteria; and
      generating the response to indicate the selected subset of events.

10. The method of claim 9, wherein selecting a subset of the events comprises (i) filtering the events indicated by the log data based on an intensity, duration, or number of the events, or (ii) ranking the events and selecting the subset of the events based on the ranking.

11. The method of claim 1, wherein the request references a network management action; and
wherein generating the response comprises generating the response to include a series of instructions for carrying out a procedure for performing the network management action.

12. The method of claim 1, comprising determining, based on the data indicating the transcription of the spoken request and the status information for the satellite communication system, a dialogue state from among multiple dialogue states that represent different steps for performing a management task related to the satellite communication system; and
wherein generating the response is performed based on the determined dialogue state, wherein each of the dialogue states have different sets of associated content, and the response is generated using the content associated with the determined dialogue state.

13. The method of claim 1, comprising selecting a task or workflow, from among multiple predetermined tasks or workflows, based on the data indicating the transcription of the spoken request and the status information for the satellite communication system;
wherein generating the response comprises including, in the response, a request to the user that guides the dialogue to the selected task or workflow.

14. The method of claim 13, wherein each of predetermined tasks or workflows comprises a series of dialogue states, and wherein generating the response comprises generating the response using content associated with one or more dialogue states of the selected task or workflow.

15. A system comprising:
one or more computers; and
one or more computer-readable media storing instructions that, when executed by the one or more computers, cause the one or more computers to perform operations comprising:
receiving, by the one or more computers, data indicating a transcription of a spoken request from a user of a voice-response interface for a satellite communication system, wherein the spoken request is detected by a client device and the transcription is generated by an automated speech recognizer;
accessing, by the one or more computers, status information for the satellite communication system, the status information indicating current characteristics of the satellite communication system;
interpreting, by the one or more computers, the request based on the transcription and the status information for the satellite communication system;
generating a response to the request based on the status information for the satellite communication system;
causing, by the one or more computers, a synthesized speech utterance of the response to be output by the client device in response to the spoken request;
obtaining, during a conversational dialogue between the user and the voice interface that includes multiple rounds of interaction that each include (i) spoken user input and (ii) a response through the voice interface, content of different user interfaces successively displayed during the conversational dialogue; and
generating and providing, for one or more of the responses through the voice interface, a particular response, based on the content of the successive user interface views, that refers to one or more user-selectable controls from among the set of user-selectable controls available to the user in the user interface view shown to the user when the particular response is output to the user.

16. The system of claim 15, wherein the operations comprise:
accessing data indicating a predetermined threshold for initiating a message over the voice-response interface, the predetermined threshold corresponding to a condition of the satellite communication system;
determining, based on evaluation of one or more attributes of the status information with the predetermined threshold, that the predetermined threshold is satisfied; and
in response to determining that the predetermined threshold is satisfied, initiating transmission of a message indicating the presence of the condition of the satellite communication system.

17. The system of claim 15, wherein the operations comprise:
determining that a condition of the satellite communication system is present;
identifying a previous instance of the condition of the satellite communication system and one or more previous network management actions that removed the previous instance of the condition; and
providing a message indicating the previous network management actions that removed the previous instance of the condition.

18. The system of claim 15, wherein the operations comprise providing, by the one or more computers and to the client device over a network, instructions causing display of a user interface indicating current or historical attributes of the satellite communication system;
wherein generating the response comprises generating a response that refers to the current or historical attributes of the satellite communication system that the instructions caused to be displayed on the user interface.

19. One or more non-transitory computer-readable media storing instructions that, when executed by one or more computers, cause the one or more computers to perform instructions comprising:
receiving, by the one or more computers, data indicating a transcription of a spoken request from a user of a voice-response interface for a satellite communication system, wherein the spoken request is detected by a client device and the transcription is generated by an automated speech recognizer;
accessing, by the one or more computers, status information for the satellite communication system, the status information indicating current characteristics of the satellite communication system;
interpreting, by the one or more computers, the request based on the transcription and the status information for the satellite communication system;
generating a response to the request based on the status information for the satellite communication system;
causing, by the one or more computers, a synthesized speech utterance of the response to be output by the client device in response to the spoken request;
obtaining, during a conversational dialogue between the user and the voice interface that includes multiple rounds of interaction that each include (i) spoken user input and (ii) a response through the voice interface, content of different user interfaces successively displayed during the conversational dialogue; and
generating and providing, for one or more of the responses through the voice interface, a particular response, based on the content of the successive user interface views, that refers to one or more user-selectable controls from among the set of user-selectable controls available to the user in the user interface view shown to the user when the particular response is output to the user.

\* \* \* \* \*